No. 876,318. PATENTED JAN. 14, 1908.
R. H. BOWMAN.
CLUTCH MECHANISM.
APPLICATION FILED AUG. 15, 1907.

2 SHEETS—SHEET 1.

WITNESSES:
John T. Schrott
H. Woodard

INVENTOR
Robert H. Bowman
BY
Fred G. Dieterich
ATTORNEYS

No. 876,318.
PATENTED JAN. 14, 1908.
R. H. BOWMAN.
CLUTCH MECHANISM.
APPLICATION FILED AUG. 15, 1907.
2 SHEETS—SHEET 2.
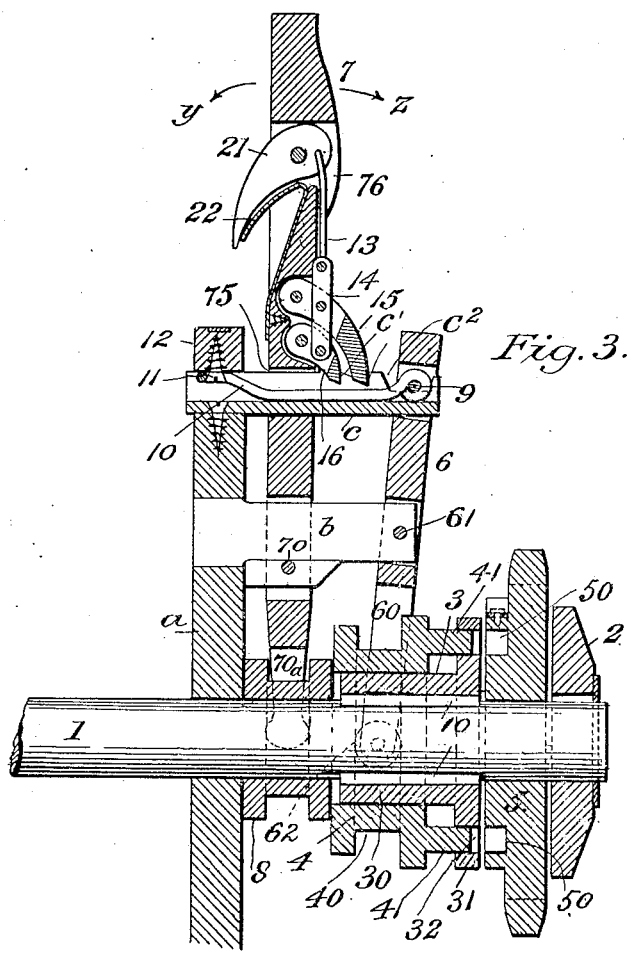
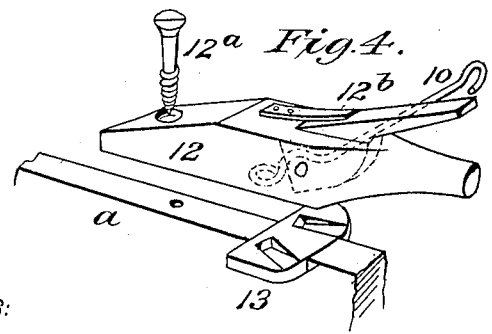
WITNESSES:
John T. Schrott
H. Woodard
INVENTOR
Robert H. Bowman
BY
Fred G. Dieterich & Co.
ATTORNEYS

UNITED STATES PATENT OFFICE.

ROBERT HENRY BOWMAN, OF CANON CITY, COLORADO.

CLUTCH MECHANISM.

No. 876,318.   Specification of Letters Patent.   Patented Jan. 14, 1908.

Application filed August 15, 1907. Serial No. 388,628.

*To all whom it may concern:*

Be it known that I, ROBERT HENRY BOWMAN, residing at Canon City, in the county of Fremont and State of Colorado, have invented a new and Improved Clutch Mechanism, of which the following is a specification.

My present invention, which generally relates to clutch or power transmitting gear or keying mechanism, forms a divisional part of my complete construction of propelling mechanism, disclosed in a co-pending application filed August 15, 1907, No. 388,627, and it comprehends an improved construction of mechanism of the character stated, of a simple and economical nature that can be quickly and positively manipulated for the desired purposes and which will effectively operate to lock the power transmitting pulleys or gears to the drive shafts, all of which will hereinafter be described in detail, specifically pointed out in the appended claims, and illustrated in the accompanying drawings, in which:—

Figure 1:
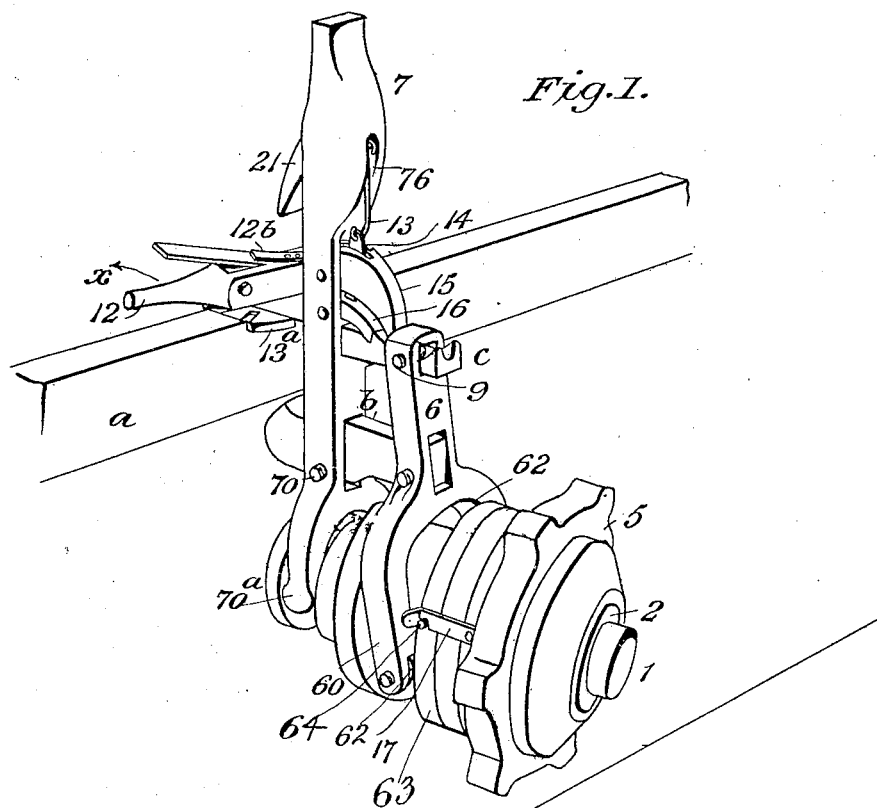
Figure 2:
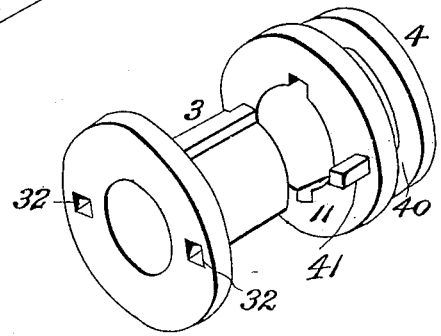

Figure 1, is a perspective view of my improved construction of clutch mechanism, the several parts being adjusted to key or lock the power or sprocket gear to the drive shaft. Fig. 2, is a detail perspective view of the two shiftable key sleeves hereinafter referred to, separated. Fig. 3, is a vertical section of the complete mechanism, the parts being adjusted to allow the sprocket wheel to run loosely on the shaft, and Fig. 4, is a detail view of one of the shifting lever devices, hereinafter specifically referred to.

In my co-pending application, I have described an improved construction of propelling mechanism in which is included a series of propelling shafts, each equipped with a power transmitting sprocket wheel loosely mounted thereon.

For the practical application of the mechanism disclosed in my said co-pending application an individual means must be provided for each transmitting sprocket wheel for keying the said wheel on the shaft or releasing it to run loosely at desired times.

My present invention comprehends a preferred construction of means for such purpose, which I shall now proceed to describe in detail.

By referring now more particularly to Fig. 3 of the drawing in which the several parts are adjusted to allow the drive sprocket wheel to run loosely, 1 designates the drive shaft, in practice, suitably mounted, and having one end projected beyond the framing $a$ which may represent the side of a boat, and which carries at its outer end a disk 2 fixedly mounted on the said shaft, as shown.

3—4 designate two sleeves or collars, one of which 3, is slidably mounted on the shaft 1, has key-ways 30 to engage the keys 10 on the shaft, and has a friction disk 31 at its outer end for engaging the inner face of the sprocket wheel 5, that is loosely mounted on the shaft 1 and disposed adjacent the disk 2 for frictionally engaging it in the manner presently explained.

The disk portion 31 of the sleeve 3 is also formed with a plurality of apertures 32 that register with a series of like positioned sockets 50 in the inner face of the wheel 5 as clearly shown in Fig. 3.

The sleeve 4 is slidable on the sleeve 3 and it has an annular groove 40 and a series of keying lugs 41 adapted to be shoved through the apertures 32 and into the sockets 50 as will presently be more fully explained. The groove 40 accommodates the bifurcated ends 60—60 of a shifting lever 6 that is fulcrumed at 61 on a bracket $b$ that projects from the frame $a$. The lower bifurcated ends of the lever carry friction rollers 62 for reducing friction between said ends and the sleeve 4 while shaft 1 is rotating.

7 designates the main shifting lever, also fulcrumed as at 70 on the bracket $b$ and it has its lower end bifurcated as at $70^a$ to coöperate with another annularly grooved collar 8 slidably and loosely mounted on the shaft 1 adjacent the framing $a$ whose function is to move both sleeves or collars 3 and 4 outwardly after the said two collars have been primarily adjusted by the lever 6 as will presently appear.

Projected outwardly from the upper edge of side frame $a$ is a longitudinally grooved bracket $c$ that has ratchet teeth $c'$, and a free way $c^2$ in which plays a cross pin 9 in the upper end of the lever 6 which is apertured to straddle and move freely over the outer end of the bracket $c$, it being held to rock on its fulcrum on bracket $b$ by a rod 10 that lies on the grooved bottom of bracket $c$, see Fig. 3, is made fast at the outer end to the cross pin 9 and has its inner end secured to the stud 11 pendent from the horizontally shiftable lever 12 fulcrumed at $12^a$ on the frame $a$ and provided with a spring latch $12^b$ for engaging a ratchet plate 13 for holding the said lever to its inward or outward adjustments.

The main band or shifting lever 7 is apertured as at 75 to fit over the ratchet bracket c and it has an elongated slot 76 in which is fulcrumed a hand gripped releasing member 21 held to its outer or normal position by a spring 22. To the said member 21 is connected one end of a pendent rod 13 that joins with a link 14 that pivotally connects with a pair of pawls 15—16 that engage the ratchet teeth on bracket c which normally engage with the said teeth as clearly shown in Fig. 3, such positioning of the pawls being provided for by the rigid connection that joins the pawls with the spring held member 21.

By reason of the construction and coöperative arrangement of parts shown and described, I have provided for an initial frictional coupling of the sprocket wheel to the shaft and a positive locking of the said wheel to the shaft, both operations of which can be independently and readily effected, since first moving the lever 7 in the direction of the arrow Y, see Fig. 3, causes the collar 8 to slide outwardly and thereby move both of the sleeves and at the same time bring the disk 31 into frictional engagement with the sprocket wheel and said wheel into engagement with the disk 2 on the end of the shaft 1.

As the two sleeves 3 and 4 are moved outwardly by the lever 7, the sleeve 4 is moved into position to be readily forced into a locked engagement with the wheel 5, which operation is effected by swinging the lever 12 horizontally inwardly, which swings the lever 6 in such manner as to force the sleeve 4 further outward to move the lugs 41 into the sockets 50 in the wheel 5 as will be clearly understood by referring to Fig. 3.

To release the keying of the wheel 5 onto shaft 1 the operator presses the member 21 inwardly as he grasps the lever 7 which lifts the pawls from engagement with the rack member c and permits of swinging the said lever in the direction of arrow z, thus breaking the direct frictional contact between the wheel 5, disk 31 and the disk on the outer end of the shaft, and by moving the horizontally adjustable lever outwardly, the sleeve 4 will be swung backwardly sufficient to bring its lugs out of engagement with the sockets in the wheel 5 and thereby leave said wheel loose to freely turn on shaft 1.

To maintain a positively locked position of the several parts when they have been shifted to key the wheel to the shaft, a locking latch 17 pivotally mounted on a flange 63 of wheel 5 is swung into a locked engagement with a stud 64 on the sleeve 4, as clearly shown in Fig. 1.

From the foregoing, taken in connection with the drawings, the general advantages and manner of operation of my invention, it is believed, will be readily understood.

By reason of arranging the main lever and the rack and the pawl devices that coöperate therewith, as shown permits of pulling the said lever back and relieving the strain on the dogs or pawls before raising them, and furthermore, by providing the initial and secondary friction means for keying the wheel to the shaft, the said wheel can be keyed to the said shaft without sudden jars or shocks to the machinery to which power is transmitted through wheel 5, since the friction can be first gradually put on by shoving the disk 31 against the wheel 5 and the wheel 5 against the disk on the end of shaft and afterward positively locking the parts together by moving the lugs on disk 4 into the sockets 50 in the wheel 5.

What I claim is:

1. In a mechanism of the character described, the combination with the shaft, a disk fixedly held thereon, and a sprocket wheel loosely mounted on the shaft adjacent the disk, said wheel having a clutch face; of a sleeve slidable on the shaft for frictionally engaging the wheel, a clutch sleeve that turns with the friction sleeve and is slidably mounted for clutching with the clutch face of the sprocket wheel, a lever mechanism for moving the two sleeves together toward the sprocket wheel, and another lever mechanism for sliding the clutch sleeve independently of the friction sleeve for the purposes set forth.

2. In a mechanism of the character described, the combination with the drive shaft, a disk fixedly held thereon, and a drive gear loosely mounted on the shaft adjacent the said disk, said drive gear having one face arranged to frictionally engage with the disk 2 and its opposite face provided with clutch portions; of an inner sleeve rotatable with the shaft but slidable thereon for engaging the wheel and frictionally forcing it against the fixedly held disk, an outer sleeve rotatable with, but slidable upon the inner sleeve, said outer sleeve having clutch members adapted to move into engagement with the clutch portions of the drive gear after the said drive gear has been moved into frictional engagement with the shaft disk, a lever for simultaneously moving the inner and the outer disks outwardly toward the gear and another lever mechanism for imparting the supplemental movement to the clutch sleeve whereby to move the said sleeve into a clutch engagement with the gear, substantially as shown and for the purposes described.

3. In a mechanism of the character described, the combination with the shaft, the disk fixedly held thereon, and the transmitting wheel loosely mounted thereon; of the inner sleeve rotatable with and slidably mounted on the shaft, said sleeve including a disk for frictionally engaging the transmitting wheel, said disk having apertures, the wheel having sockets adapted to register with the said apertures, a lever for shifting the said disk on the shaft, a pawl and rack mechanism coöperating with the said lever, a second sleeve mounted on the first sleeve slidable thereon, and rotatable therewith, said second sleeve having projecting studs adapted to extend through the apertures in the disk of the first sleeve and into the sockets of the transmitting gear, a bifurcated lever for engaging the second mentioned sleeve, and a spring latch controlled shifting member for actuating the said lever.

ROBERT HENRY BOWMAN.

Witnesses:
 GUY W. HARDY,
 ETHEL HUXLEY.